(12) United States Patent
Discekici et al.

(10) Patent No.: US 12,447,673 B2
(45) Date of Patent: Oct. 21, 2025

(54) THREE-DIMENSIONAL PRINTING WITH ORGANIC DYE RADIATION ABSORBERS

(71) Applicant: PERIDOT PRINT LLC, Palo Alto, CA (US)

(72) Inventors: Emre Hiro Discekici, San Diego, CA (US); Krzysztof Nauka, Palo Alto, CA (US); Shannon Reuben Woodruff, San Diego, CA (US); Stephen G Rudisill, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 284 days.

(21) Appl. No.: 17/926,985

(22) PCT Filed: Jun. 4, 2020

(86) PCT No.: PCT/US2020/036042
§ 371 (c)(1),
(2) Date: Nov. 21, 2022

(87) PCT Pub. No.: WO2021/247023
PCT Pub. Date: Dec. 9, 2021

(65) Prior Publication Data
US 2023/0202102 A1 Jun. 29, 2023

(51) Int. Cl.
*B29C 64/165* (2017.01)
*B33Y 10/00* (2015.01)
(Continued)

(52) U.S. Cl.
CPC ............ *B29C 64/165* (2017.08); *B33Y 10/00* (2014.12); *B33Y 30/00* (2014.12); *B33Y 70/00* (2014.12); *B29K 2105/0032* (2013.01)

(58) Field of Classification Search
CPC ......... B33Y 10/00; B33Y 30/00; B33Y 70/00; B29C 64/165; B29K 2105/0032
See application file for complete search history.

(56) References Cited

U.S. PATENT DOCUMENTS

| 4,256,817 A | 3/1981 | Hara |
| 9,574,039 B1 | 2/2017 | Liu et al. |

(Continued)

FOREIGN PATENT DOCUMENTS

| CN | 110330501 A | 10/2019 |
| WO | 2016/175832 A1 | 11/2016 |
| WO | 2019/108288 A1 | 6/2019 |

OTHER PUBLICATIONS

Adeel. S., et al., "Eco-friendly disperse dyeing of Ultraviolet-Treated polyester fabric using Disperse Yellow 211", Polish Journal of Environmental. Studies, vol. 27, No. 5, May 9, 2018, pp. 1935-1939.

(Continued)

*Primary Examiner* — Monica A Huson
(74) *Attorney, Agent, or Firm* — Dierker & Kavanaugh, P.C.

(57) ABSTRACT

A three-dimensional printing kit can include a polymeric build material including from about (80) wt % to (100) wt % polymer particles having an average particle size from about (10) μm to about (150) μm, and can also include a fusing agent including an aqueous liquid vehicle and from about (2) wt % to about (20) wt % of a mixture of organic dye radiation absorbers. The mixture of organic dye radiation absorbers can include a charged yellow water-soluble organic dye and a cyan water-soluble organic dye. The mixture of the organic dye radiation absorbers can be from about (1) wt % to about (40) wt % soluble in water.

16 Claims, 3 Drawing Sheets

(51) Int. Cl.
*B33Y 30/00* (2015.01)
*B33Y 70/00* (2020.01)
*B29K 105/00* (2006.01)

(56) References Cited

U.S. PATENT DOCUMENTS

2013/0011617 A1 1/2013 Tasaki et al.
2018/0311892 A1 11/2018 Abbott, Jr. et al.
2019/0194462 A1 6/2019 Heikkila et al.

OTHER PUBLICATIONS

Park. H.K., et al., "A visible light-curable yet visible wavelength-transparent resin for stereolithography 3D printing", NPG Asia Materials, vol. 10, Apr. 5, 2018, pp. 82-89.

THREE-DIMENSIONAL PRINTING WITH ORGANIC DYE RADIATION ABSORBERS

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques can be considered additive processes because they involve the application of successive layers of material. This can be unlike other machining processes, which often focus more on removal of material to create the final part.

DETAILED DESCRIPTION

Figure 1:
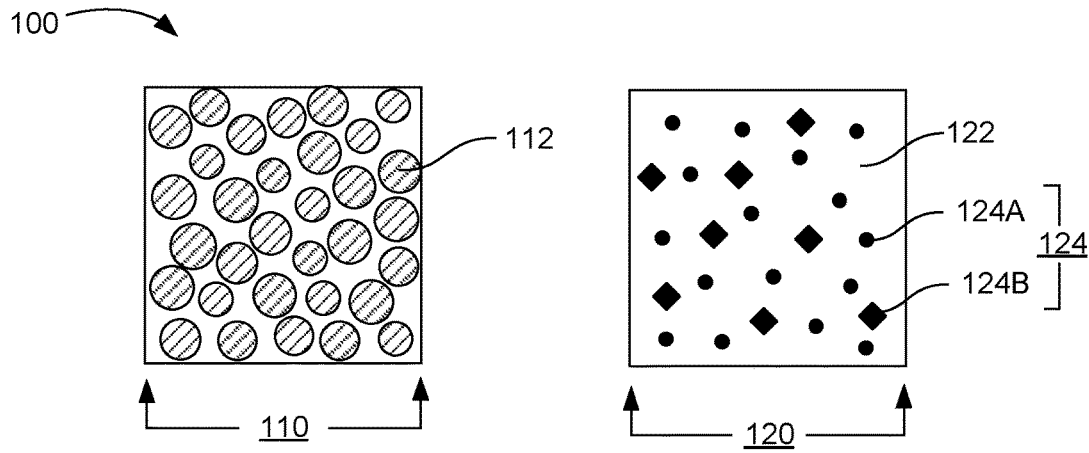
FIG. 1 is a schematic illustration of an example three-dimensional printing kit in accordance with the present disclosure.

Three-dimensional printing can be an additive process involving the application of successive layers of a polymeric build material with a fusing agent printed thereon to bind the successive layers of the polymeric build material together. More specifically, a fusing agent including a radiation absorber can be selectively applied to a layer of a polymeric build material on a support bed, e.g., a build platform supporting polymeric build material, to pattern a selected region of a layer of the polymeric build material. The layer of the polymeric build material can be exposed to electromagnetic radiation, and due to the presence of the radiation absorber on the printed portions, absorbed light energy at those portions of the layer having the fusing agent printed thereon can be converted to thermal energy, causing that portion to melt or coalesce, while other portions of the polymeric build material reach temperatures suitable to melt or coalesce. This can then be repeated on a layer-by-layer basis until the three-dimensional object is formed.

In accordance with this, a three-dimensional printing kit (or "kit") can include a polymeric build material including from about 80 wt % to 100 wt % polymer particles that can have an average particle size from about 10 μm to about 150 μm and a fusing agent including an aqueous liquid vehicle from about 2 wt % to about 20 wt % of a mixture of organic dye radiation absorbers. The mixture of organic dye radiation absorbers can include a charged yellow water-soluble organic dye and a cyan water-soluble organic dye. The mixture of the organic dye radiation absorbers can be from about 1 wt % to about 40 wt % soluble in water. In an example, the polymeric build material can include polyamide, polyethylene, polyethylene terephthalate (PET), polyolefin, polystyrene, polyacrylate, polyacetal, polypropylene, polycarbonate, polyester, acrylonitrile butadiene styrene, thermoplastic polyamide, thermoplastic polyurethane, engineering plastic, polyether ketone, polyetheretherketone (PEEK), polyethylene terephthalate, polybutylene terephthalate, polymer blends thereof, amorphous polymers thereof, core-shell polymers thereof, or a copolymer thereof. In another example, the aqueous liquid vehicle can include from about 5 wt % to about 50 wt % organic co-solvent. The organic co-solvent can include ethanol, methanol, propanol, acetone, tetrahydrofuran, hexane, 1-butanol, 2-butanol, tert-butanol, isopropanol, propylene glycol, methyl ethyl ketone, dimethylformamide, 1,4-dioxone, acetonitrile, 1,2-butanediol, 1-methyl-2,3-propanediol, 2-pyrrolidone, glycerol, 2-phyenoxyethanol, 2-phenylethanol, 3-phenylpropanol, or a combination thereof. In yet another example, the aqueous liquid vehicle can include from about 0.01 wt % to about 2 wt % surfactant. In a further example, the charged yellow water-soluble organic dye can exhibit peak absorption at from about 380 nm to about 490 nm and the cyan water-soluble organic dye can exhibit a peak absorption at from about 580 nm to about 720 nm, and wherein the charged yellow water-soluble organic dye absorbs electromagnetic energy within a range of about 350 nm to about 460 nm. In one example, the mixture of the organic dye radiation absorbers can include a charged magenta water-soluble organic dye in addition to the yellow and cyan dyes already included. In another example, the aqueous liquid vehicle can further include a fluorescent quencher. In yet another example, the fusing agent can include the mixture of the organic dye radiation absorbers at a weight ratio from about 3 wt % to about 8 wt %. In a further example, the kit can further include a detailing agent. The detailing agent can include a detailing compound to reduce a temperature of the polymeric build material onto which the detailing agent is applied.

In another example of the present disclosure, a method of three-dimensional printing (or "method") can include iteratively applying a polymeric build material as individual layers, wherein the polymeric build material can include from about 80 wt % to 100 wt % polymeric particles that can have an average particle size from about 10 μm to about 150 μm, and based on a three-dimensional object model, selectively applying a fusing agent that can include an aqueous liquid vehicle and from about 2 wt % to about 20 wt % of a mixture of organic dye radiation absorbers where the mixture of organic dye radiation absorbers can include a charged yellow water-soluble organic dye and a cyan water-soluble organic dye and where the mixture of organic dye radiation absorbers can be from about 1 wt % to about 40 wt % soluble in water. The method further includes exposing the powder bed to ultraviolet energy or high-energy visible light that can have a wavelength in a range from about 350 nm to about 460 nm to selectively fuse portions of the individual layers of the polymeric build material together and form a three-dimensional object. In another example, a weight ratio of the polymeric build material to the mixture of the radiation absorbers following selectively applying the fusing agent onto the polymeric build material can range from about 10:1 to about 350:1. In yet another example, the method can further include applying a detailing agent onto individual layers of the polymer build material to selectively cool the polymeric build material. In a further example, the fusing agent can include the charged yellow water-soluble organic dye in an amount equal to or greater than an amount of the cyan water-soluble organic dye in the fusing agent.

In a further example, a three-dimensional printing system (or "system") can include a polymeric build material including from about 80 wt % to 100 wt % polymer particles that can have an average particle size from about 10 µm to about 150 µm; a fusing agent that can include an aqueous liquid vehicle and from about 2 wt % to about 20 wt % of a mixture of organic dye radiation absorbers where the mixture of organic dye radiation absorbers can include a charged yellow water-soluble organic dye and a cyan water-soluble organic dye and where the mixture of organic dye radiation absorbers can be from about 1 wt % to about 40 wt % soluble in water; and an ultraviolet energy source that can emit ultraviolet energy having a peak wavelength in a range from about 350 nm to about 405 nm, or a high-energy visible light source that emits high-energy visible light having a peak wavelength in a range from about 400 nm to about 460 nm (the narrow band wavelength may span the UV energy and HEV light ranges in some examples). In another example, the system can include the ultraviolet energy source and the ultraviolet energy source can be an UV-LED array having a peak emission of ultraviolet energy with a narrow band wavelength of from about 10 nm about 20 nm. The narrow band wavelength can correspond with a peak absorption of at least one of the radiation absorbers in the mixture of the radiation absorbers.

When discussing the three-dimensional printing kit, method of three-dimensional printing, and/or the three-dimensional printing system herein, these discussions can be considered applicable to one another whether or not they are explicitly discussed in the context of that example. Thus, for example, when discussing a polymeric build material related to a three-dimensional printing kit, such disclosure is also relevant to and directly supported in the context of the method of three-dimensional printing, the three-dimensional printing system, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Kits

A three-dimensional printing kit 100 is shown by way of example in FIG. 1. The three-dimensional printing kit can include, for example, a polymeric build material 110 and a fusing agent 120. The polymeric build material can include from about 80 wt % to 100 wt % polymer particles 112 having an average particle size from about 10 µm to about 150 µm. The fusing agent can include an aqueous liquid vehicle 122 and from about 2 wt % to about 20 wt % a mixture of organic dye radiation absorbers 124. The mixture of organic dye radiation absorbers can include a charged yellow water-soluble organic dye 124A and a cyan water-soluble organic dye 124B and can be from about 1 wt % to about 40 wt % soluble in water. The mixture of organic dye radiation absorbers are shown as particles for illustrative purposes, but may typically be dissolved in the aqueous liquid vehicle.

In some examples, the three-dimensional printing kit can further include other fluids, such as coloring agents, detailing agents, or the like. A detailing agent, for example, can include a detailing compound which can be a compound that can reduce a temperature of the polymeric build material when applied thereto. In some examples, the detailing agent can be applied around edges of the application area of the fusing agent. This can prevent caking around the edges due to heat from the area where the fusing agent was applied.

The detailing agent can also be applied in the same area where the fusing agent was applied in order to control the temperature and prevent excessively high temperatures when the polymeric build material is fused.

The polymeric build material may be packaged or co-packaged with the fusing agent, coloring agent, detailing agent, or the like in separate containers, and/or can be combined with the fusing agent, coloring agent, detailing agent, or the like at the time of printing, e.g., loaded together in a three-dimensional printing system.

Methods of Three-Dimensional Printing

Figure 2:
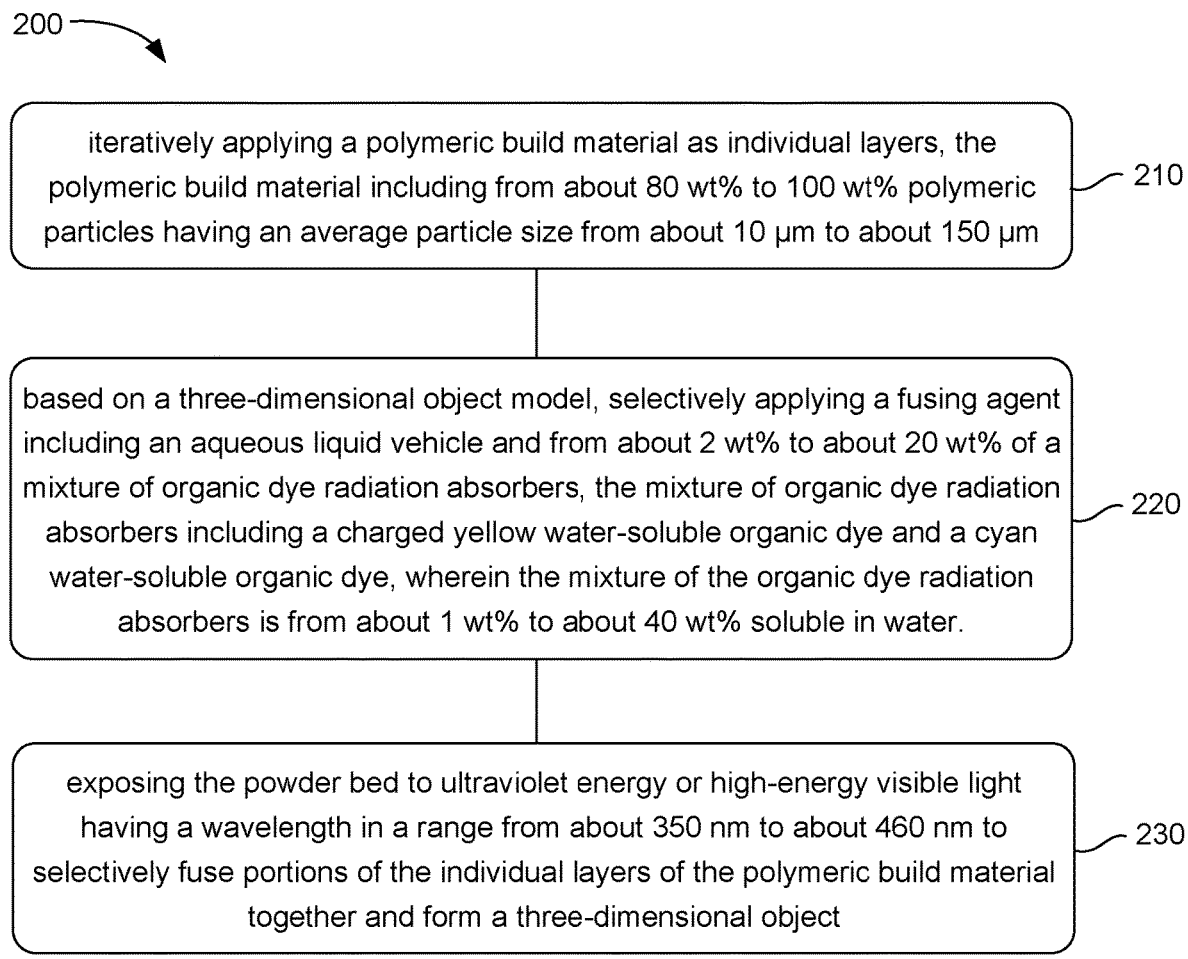
FIG. 2 is a flow diagram illustrating an example method of three-dimensional printing in accordance with the present disclosure.

A flow diagram of an example method 200 of three-dimensional (3D) printing is shown in FIG. 2. The method can include iteratively applying 210 a polymeric build material as individual layers. The polymeric build material can include from about 80 wt % to 100 wt % polymeric particles that can have an average particle size from about 10 µm to about 150 µm. Based on a three-dimensional object model, the method can include selectively applying 220 a fusing agent that can include an aqueous liquid vehicle and from about 2 wt % to about 20 wt % of a mixture of organic dye radiation absorbers. The mixture of organic dye radiation absorbers can include a charged yellow water-soluble organic dye and a cyan water-soluble organic dye and the mixture of organic dye radiation absorbers can be from about 1 wt % to about 40 wt % soluble in water. The method can further include exposing 230 the powder bed to ultraviolet energy or high-energy visible light having a wavelength in a range from about 350 nm to about 460 nm to selectively fuse portions of the individual layers of the polymeric build material together and form a three-dimensional object.

For clarity, the term "ultraviolet energy" or "UV" energy often includes electromagnetic energy wavelengths ranging from about 10 nm to about 400 nm, and visible light often is defined to include light ranging from 400 nm to 700 nm. "High-energy visible" light, or HEV light, is a sub-range of visible light often defined as ranging from about 400 nm to about 450 nm. Because of the disparities in these definitions, for purposes of the present disclosure, the range of UV energy is defined to include energy wavelengths up to about 405 nm, and HEV light is defined herein to include wavelengths up to about 460 nm. Thus, with respect to the energy wavelength ranges herein, the range of about 350 nm to about 460 nm, about 355 nm to about 455 nm, and about 350 nm to about 405 nm is defined herein to be UV energy, and the range of about 405 nm to about 460 nm is defined to be HEV energy, which encompasses violet to blue visible light. In further detail, the terms "energy" and "light" both refer to electromagnetic energy. Light is used in connection with the HEV energy, as it is within the visible light range.

In printing in a layer-by-layer manner, the polymeric build material can be spread, a fusing agent applied, the layer of the polymeric build material can be exposed to energy, and then a build platform can then be dropped a distance of 5 µm to 1 mm, which can correspond to the thickness of a printed layer of the three-dimensional object, so that another layer of the polymeric build material can be added again thereon to receive another application of the fusing agent, and so forth. During the build, the radiation absorber in the fusing agent can act to convert the ultraviolet energy to thermal energy and promote the transfer of thermal heat to polymer particles of the polymeric build material in contact with the fusing agent including the radiation absorber. In an example, the fusing agent can elevate a temperature of the polymer particles of the polymeric build material above a melting or softening point of the polymer particles, thereby allowing fusing (e.g., sintering, melting, curing, etc.) of the polymeric build material (or polymer particles thereof) and allowing the formation of an individual layer of the three-dimensional object. The method can be repeated until all the individual polymeric build material layers have been created and a three-dimensional object is formed. In some examples, the method can further include heating the polymeric build material prior to dispensing or applying the individual layers of the polymeric build material. In some examples, the method can further include heating the polymeric build material in the powder bed prior to dispensing or applying the fusing agent thereto.

With respect to applying the fusing agent to the polymeric build material, the fusing agent can be applied such that a specified amount of the radiation absorber is in contact with the polymeric build material. Accordingly, in an example, a weight ratio of the polymeric build material to the radiation absorber following the selectively applying of the fusing agent onto the polymeric build material can range from about 10:1 to about 350:1. In yet other examples, a weight ratio of the polymeric build material to the radiation absorber following the selectively applying of the fusing agent onto the polymeric build material can range from about 50:1 to about 250:1, from about 10:1 to about 100:1, from about 100:1 to about 300:1, or from about 150:1 to about 300:1.

The fusing agent may also be applied such that the mixture of radiation absorbers can be applied to the polymeric build material from a single print head or multiple print heads. For example, when one of the radiation absorbers or a mixture of the radiation absorbers act as the dominant radiation absorber(s) (e.g., UV-HEV light absorber) for the wavelength of energy applied during fusing, these radiation absorber(s) may be applied from one print head and the secondary radiation absorber(s) may be applied from a different print head. This can allow these radiation absorber(s) to be applied at a different amount and/or in different areas than the secondary radiation absorbers. Printing these radiation absorber(s) in different areas from the secondary radiation absorber can allow for increased application density near a lateral edge of a three-dimensional object layer to compensate for heat loss. In yet other examples, all of the mixture of radiation absorbers may be applied from a single print head.

In some examples, the exposing can include the ultraviolet energy and the ultraviolet energy can be from an ultraviolet (UV) light source. UV light sources can have higher efficiency, longer lifespans, and smaller sizes than infrared or near-infrared light sources. Example UV light sources can include an electric arc, mercury-vapor lamp, incandescent "black light" lamp, short-wave ultraviolet lamp, fluorescent lamp tube, gas-discharge lamp, xenon arc lamp, deuterium arc lamp, mercury-xenon arc lamp, metal-halide arc lamp, excimer lamp, light-emitting diode, gas laser, laser diode, solid-state laser, or a combination thereof. In one example, the ultraviolet energy can be from an ultraviolet light emitting diode (UV-LED) light array. With respect to UV-LED light emitting diode light arrays, individual light bulbs on the array can be turned on and off. This can permit selective application of the ultraviolet energy by activating a plurality of individual UV-LED lights of an UV-LED light array. This can also reduce energy consumption.

In yet other examples, the exposing can include the use of high-energy visible light from a high-energy visible light source. Example high-energy visible light sources can include a blue LED light array, tungsten-halogen lamp, mercury-xenon arc lamp, xenon arc lamp, gas laser, laser diode, solid-state laser, or a combination thereof. In the case of broad-band emitting sources, narrow band irradiation can be achieved with help of a narrow band transmission filter.

In some examples, the ultraviolet energy source and/or the high-energy visible light source can emit a wavelength of from about 350 nm to about 460 nm. In yet another example, the ultraviolet energy source can be used which can emit ultraviolet energy at a wavelength from about 355 nm to about 455 nm, from about 355 nm to about 405 nm, from about 375 nm to about 400 nm, from about 360 nm to about 390 nm, or from about 380 nm to about 405 nm. Alternatively or additionally, the high-energy visible light source can be used, which can emit HEV light at from about 405 nm to about 455 nm, or from about 405 nm to about 450 nm. In other examples, the energy source used can emit electromagnetic energy at a wavelength spanning both the UV energy range and the HEV light range, e.g., from about 360 nm to about 450 nm, from about 390 nm to about 450 nm, from about 375 nm to about 430 nm, etc. In further detail, the peak emission of the UV energy source or HEV light source can fall within the range of about 350 nm to about 460 nm, but the bandwidth, e.g., about 30 nm wide, may overlap both the UV energy range and the HEV light range. Alternatively, the bandwidth may fall solely within the UV range or the HEV range.

In some examples, the method can further include, iteratively and selectively dispensing or applying a detailing agent onto an individual polymeric build material layer laterally at a border between a first area where the individual polymeric build material layer was contacted by the fusing agent and a second area where the individual polymeric build material layer was not contacted by the fusing agent. This can cool the polymeric build material and prevent caking around the edges due to heat from the area where the fusing agent was applied. The detailing agent can also be applied in the same area where the fusing agent was applied in order to control a temperature of the polymeric build material and prevent excessively high temperatures when the polymeric build material is fused.

Three-Dimensional Printing Systems

Figure 3:
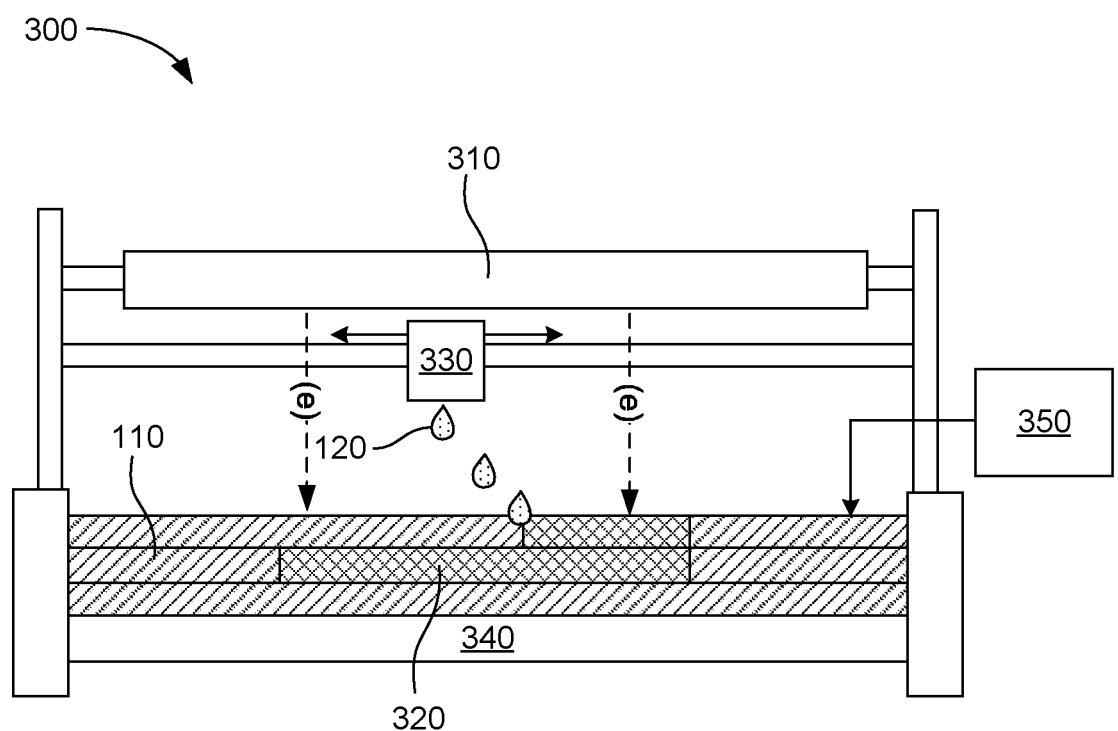
FIG. 3 is a schematic illustration of an example three-dimensional printing system in accordance with the present disclosure.

A three-dimensional printing system 300 in accordance with the present disclosure is illustrated schematically in FIG. 3. The three-dimensional printing system can include a polymeric build material 110 (shown as applied in layers), a fusing agent 120, and an ultraviolet energy source or a high-energy visible light source 310. The polymeric build material can include from about 80 wt % to 100 wt % polymer particles that can have an average particle size from about 10 μm to about 150 μm. The fusing agent can include an aqueous liquid vehicle and from about 2 wt % to about 20 wt % of a mixture of organic dye radiation absorbers (shown at 124 in FIG. 1). The mixture of organic dye radiation absorbers can include a charged yellow water-soluble organic dye and a cyan water-soluble organic dye. The mixture of organic dye radiation absorbers can be from about 1 wt % to about 40 wt % soluble in water. The ultraviolet energy source or the high-energy visible light source can emit energy (e) that can have a peak wavelength in a range from about 350 nm to about 460 nm or some other ultravioleg and/or high energy visible light sub-range therein.

In some examples, a peak absorption of the radiation absorber can be substantially matched to a narrow band wavelength emitted by the energy source. As used herein, "peak absorption" indicates that from about 70% to about 100% of light emitted in the specified wavelength range is absorbed by the radiation absorber. For example, the charged yellow water-soluble organic dye may exhibit peak absorption at from about 380 nm to about 490 nm. The cyan water-soluble organic dye may exhibit peak absorption from about 580 nm to about 720 nm. In yet other examples at least about 75%, at least about 80%, at least about 85%, at least about 90%, at least about 95%, or 100% of the light emitted in the wavelengths emitted by the energy source is absorbed by the radiation absorber. The absorption can occur beyond the peak wavelength, however. For example, a charged yellow water-soluble organic dye having a peak absorption at about 490 nm can still include an absorbance profile where electromagnetic energy emitted at or below 460 nm occurs, e.g., from 350 nm to 460 nm. In one example, however, the energy source can emit energy that can have a full width at half max of less than about 40 nm, or less than about 30 nm, corresponding with a peak absorption of the radiation absorber. In yet other examples, the energy source can emit energy that can have a full width at half max of less than about 25 nm, less than about 20 nm, less than about 15 nm, less than about 10 nm, or less than about 5 nm corresponding with a peak absorption of the radiation absorber.

The energy source can be positioned to expose the individual layers of the polymeric build material to ultraviolet energy or high-energy visible light to selectively fuse polymer particles of the polymeric build material in contact with the mixture of organic dye radiation absorbers (forming fused layers) to iteratively form individual layers of a three-dimensional object 320. In some examples, the energy source can be operatively connected to a lamp/laser driver, an input/output temperature controller, and/or temperature sensors.

In some examples, the fusing agent, the detailing agent, or other fluid agent can be applied via a fluid applicator and the system can further include a fluid applicator 330. The fluid applicator can be a digital fluid ejector, e.g., thermal or piezo jetting architecture. The fluid applicator, in an example, can be fluidly coupled or coupleable to a fluid agent to iteratively apply the fluid agent to the polymeric build material to form individually patterned object layers. The fluid applicator can be any type of apparatus capable of selectively dispensing or applying a fluid agent. For example, the fluid applicator can be a fluid ejector or digital fluid ejector, such as an inkjet print head, e.g., a piezo-electric print head, a thermal print head, a continuous print head, etc. The fluid applicator could likewise be a sprayer, a dropper, or other similar structure for applying a fluid agent to the polymeric build material. Thus, in some examples, the application can be by jetting or ejecting from a digital fluid jet applicator, similar to an inkjet pen.

In an example, the fluid applicator, when present, can be located on a carriage track, but could be supported by any of a number of structures. In yet another example, the fluid applicator can include a motor (not shown) and can be operable to move back and forth, and the fluid applicator can also be moved front to back as well, to provide both x-axis and y-axis movement over the polymeric build material when positioned over or adjacent to a polymeric build material on a powder bed of a build platform.

In an example, the three-dimensional printing system can further include a build platform 340 to support the polymeric build material. The polymeric build material 110 can be deposited onto the build platform by a build material applicator 350 where the particulate build material can be flattened or smoothed, such as by a mechanical roller or other flattening technique. This can form a flat layer of particulate build material. The build platform can be positioned to permit application of the fusing agent onto a layer of the polymeric build material. The build platform can be configured to drop in height, thus allowing for successive layers of the polymeric build material to be applied by a supply and/or a spreader. The polymeric build material can be layered in the build platform at a thickness that can range from about 5 µm to about 1 mm. In some examples, individual layers can have a relatively uniform thickness. In one example, a thickness of a layer of the polymeric build material can range from about 10 µm to about 500 µm, from about 50 µm to about 300 µm, from about 250 µm to about 500 µm, or from about 30 µm to about 200 µm. Furthermore, heat can be applied to the build platform, or from any other direction or time, to bring the polymeric build material to a temperature near its fusing temperature, making it easier to bring up a temperature enough to generate fusion of the polymeric build material. For example, heat may be applied to the polymeric build material in the powder bed from the build platform, from above, or to the polymeric build material prior to being spread on the powder bed to preheat the polymeric build material within about 10° C. to about 70° C. of a fusing temperature of the polymer particles so that less energy may be applied to bring the polymer particles to their fusing temperature.

Polymeric Build Materials

The polymeric build material can be used as the bulk material of the three-dimensional printed object. As mentioned, the polymeric build material can include from about 80 wt % to 100 wt % polymer particles. In another example, the polymeric build material can include from about 85 wt % to about 95 wt %, from about 90 wt % to 100 wt %, or 100 wt % polymer particles.

In an example, the polymeric build material can include polyamide, polyethylene, polyethylene terephthalate (PET), polyolefin, polystyrene, polyacrylate, polyacetal, polypropylene, polycarbonate, polyester, acrylonitrile butadiene styrene, thermoplastic polyamide, thermoplastic polyurethane, engineering plastic, polyether ketone, polyetheretherketone (PEEK), polyethylene terephthalate, polybutylene terephthalate, polymer blends thereof, amorphous polymers thereof, core-shell polymers thereof, or a copolymer thereof. In one example, the polymeric build material can include polyamide, polypropylene, polyolefin, or a combination thereof. In another example, the polymeric build material can include a polyamide. In yet another example, the polymeric build material can include a thermoplastic polyamide.

The polymeric build material may include similarly sized polymer particles or differently sized polymer particles. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter. An average particle size can refer to a mathematical average of the particle sizes. Alternatively, the particle size can be based on a particle size distribution including a D50 particle size, where 50% of the particles are larger than the D50 value and 50% of the particles are smaller than the D50 value. The polymer particles can have an average particle size from about 10 μm to about 150 μm, from about 25 μm to about 125 μm, from about 50 μm to about 150 μm, or from about 20 μm to about 80 μm. In another example, the D50 particle size can independently be from about 10 μm to about 150 μm, from about 25 μm to about 125 μm, from about 50 μm to about 150 μm, or from about 20 μm to about 80 μm. The polymeric build material can, in some examples, further include flow additives, antioxidants, inorganic filler, or any combination thereof. Typically, an amount of any of these or other similar components can be at about 5 wt % or less. An example flow additive can include fumed silica. Example antioxidants can include hindered phenols, phosphites, thioethers, hindered amines, and/or the like. Example inorganic filler can include particles such as alumina, silica, fibers, carbon nanotubes, cellulose, and/or the like. Some additives may be found in multiple categories of additives, e.g., fumed silica can be a flow additive as well as a filler. In some examples, the filler or other type of additive can become embedded or composited with the polymer particles.

The polymeric build material can be capable of being printed into three-dimensional objects with a resolution of about 10 μm to about 150 μm, about 20 μm to about 100 μm, or about 25 μm to about 80 μm. As used herein, "resolution" refers to the size of the smallest feature that can be formed on a three-dimensional object. The polymeric build material can form layers from about 10 μm to about 150 μm thick, depending on the size of polymer particles present in the polymeric build material, thus allowing the fused layers of the printed object to have about the same thickness or a few to many times (e.g., 2 to 20 times) thicker than the D50 particle size of the polymer particles, for example. This can provide a resolution in the z-axis direction (e.g., the direction of the buildup of layers) of about 10 μm to about 150 μm. In some examples, however, the polymeric build material can also have a sufficiently small particle size and sufficiently uniform particle shape to provide an x-axis and y-axis resolution about the size of the polymer particle size, e.g., about 2 μm to about 150 μm (e.g., the axes parallel to the support surface of the build platform).

Fusing Agents

The three-dimensional printing kit, three-dimensional printing system, and method of three-dimensional printing can make use of a fusing agent. The fusing agent can include an aqueous liquid vehicle and from about 2 wt % to about 20 wt % of a mixture of organic dye radiation absorbers. The mixture of organic dye radiation absorbers can include a charged yellow water-soluble organic dye and a cyan water-soluble organic dye. The mixture of the organic dye radiation absorbers can be from about 1 wt % to about 40 wt %, from about 5 wt % to about 35 wt %, or from about 20 wt % to about 40 wt % soluble in water. The mixture of organic dye radiation absorbers can absorb UV-HEV energy and generate heat needed to melt adjacent particles of polymeric build material and can provide desired color to the three-dimensional printed object.

In an example, the aqueous liquid vehicle can include water at from about 25 wt % to about 98 wt %, from about 80 wt % to about 95 wt %, from about 40 wt % to about 60 wt %, or from about 60 wt % to about 90 wt %. In some examples, the aqueous liquid vehicle can also include from about 5 wt % to about 50 wt %, from about 15 wt % to about 45 wt %, or from about 2 wt % to about 20 wt % organic co-solvent. The organic co-solvent can include ethanol, methanol, propanol, acetone, tetrahydrofuran, hexane, 1-butanol, 2-butanol, tert-butanol, isopropanol, propylene glycol, methyl ethyl ketone, dimethylformamide, 1,4-dioxone, acetonitrile, 1,2-butanediol, 1-methyl-2,3-propanediol, 2-pyrrolidone, glycerol, 2-phyenoxyethanol, 2-phenylethanol, 3-phenylpropanol, or a combination thereof. In an example, the aqueous liquid vehicle can include organic-solvent to water at a weight ratio from about 1:3 to about 19:1, from about 1:3 to about 10:1, from about 1:2 to about 5:1, from about 1:2 to about 2:1, or from about 1:2 to about 1:1.

In some examples, there may be other liquid or dispersed additives in the aqueous liquid vehicle. In some examples, the aqueous liquid vehicle can further include from about 0.01 wt % to about 2 wt % or from about 0.01 wt % to about 0.5 wt % surfactant. Regarding other additives, in some examples, the fusing agent can further include a dispersant. Dispersants can help disperse the mixture of organic dye radiation absorbers. In some examples, the dispersant itself can also absorb radiation. Other additives may be present as part of the aqueous liquid vehicle, as described more fully below.

The fusing agent can include a mixture of organic dye radiation absorbers. In an example, the mixture can include a charged yellow water-soluble organic dye and a cyan water-soluble organic dye. In another example, the mixture can include a charged yellow water-soluble organic dye, a cyan water-soluble organic dye, and a charged magenta water-soluble organic dye. In an example, the charged yellow water-soluble organic dye can generate heat from absorbed electromagnetic radiation from an UV-LED or HEV light array. The cyan water-soluble organic dye (with or without the charged magenta water-soluble organic dye) can allow for the formation of a three-dimensional printed object that is not yellow in appearance and which has a more neutral coloration. Yellow printed objects may be commercially less desirable because of the stigma associated with plastic yellowing which can potentially be an indicator of plastic degradation; therefore, plastic objects which are not yellow in appearance that can be UV or HEV fused can be commercially advantageous in some instances.

The charged yellow water-soluble dye can be a natural dye or a synthetic dye. In some examples, the charged yellow water-soluble dye can be an acid dye. For example, the charged yellow water-soluble dye can be an anionic dye. In some examples, the charged yellow water-soluble dye can be a sulfur-containing dye. In further examples, the charged yellow water-soluble dye can be a sulfonated azo yellow dye. Examples of charged yellow water-soluble dyes can include CI acid yellow 23, CI acid yellow 17, CI acid yellow 4, CI acid yellow 5, CI acid yellow 21, CI acid yellow 49, CI acid yellow 42, CI acid yellow 117, or a combination thereof. In an example, the charged yellow water-soluble dye can include a sulfonated azo yellow dye, such as CI acid yellow 23, CI acid yellow 17, or a combination thereof.

The charged yellow water-soluble dye can absorb radiation of wavelengths outside of the range of UV energy that can be used to apply to a layer of build material with the fusing agent applied thereto or therein, e.g., in the range of from about 350 nm to about 490 nm. In yet other examples, the charged yellow water-soluble dye can absorb radiation of wavelengths in the range of from about 380 nm to about 490 nm, from about 390 nm to about 405 nm, from about 355 nm to about 375 nm, from about 355 nm to about 405 nm, from about 390 nm to about 455 nm, from about 405 nm to about 455 nm, or from about 380 nm to about 400 nm, or any other range recited herein, for example.

The cyan water-soluble organic dye can be a natural dye or a synthetic dye. In an example, the cyan water-soluble dye can include methylene blue, copper phthalocyanine blue, prussian blue, sulfonated derivatives of copper phthalocyanine, indigo dye, thioindigo dye, or a combination thereof. Commercially available examples can include, BASONYL® blue 636, ORASOL® blue 825, ORASOL® blue 855 (all commercially available from BASF Corporation, Germany), SAVINYL® blue RS (commercially available from Clariant International Ltd., USA), VALIFAST® blue 1605, VALIFAST® blue 1613, VALIFAST® blue 1621, VALIFAST® blue 1631, VALIFAST® blue 2606, VALIFAST® blue 2620, VALIFAST® blue 2670 (all available from Orient Chemical Industries Co., Ltd., USA), or cyan 854.

The cyan water-soluble organic dye can absorb radiation of wavelengths in the range of from about 580 nm to about 720 nm. In yet other examples, the charged cyan water-soluble organic dye can absorb radiation of wavelengths in the range of from about 600 nm to about 700 nm, from about 580 nm to about 680 nm, from about 600 nm to about 650 nm, from about 620 nm to about 720 nm, or from about 625 nm to about 675 nm, or any other range recited herein, for example.

In some examples, the mixture of the organic dye radiation absorbers can further include a charged magenta water-soluble organic dye, e.g., in addition to the yellow and cyan dyes. The charged magenta water-soluble organic dye can be a natural dye or a synthetic dye. In an example, the charged magenta water-soluble dye can include a xanthene dye, a monoazo dye, a diazo dye, an azo dye, sulfochlorinated thioindigo dye, or a combination thereof. Commercially available examples can include acid red 52, acid red 13, acid red 88, azorubine, or a combination thereof.

In some examples, the aqueous liquid vehicle can further include a fluorescent quencher. The fluorescent quencher can quench fluorescence generated from an organic dye radiation absorber. In one example, the fluorescent quencher can be used to quench fluorescence from a charged magenta water-soluble organic dye. The fluorescent quencher can be included with respect to the charged magenta water-soluble organic dye at a weight ratio of about 1:1, or from about 0.8:1 to about 1.2:1. In some examples, the fluorescent quencher can be present in the fusing agent at a weight ratio of from about 0.1 wt % to about 5 wt %, from about 0.25 wt % to about 1 wt %, from about 1 wt % to about 3 wt %, or from about 0.5 wt % to about 2.5 wt %. Example fluorescent quenchers can include hexamethyleneimine, iodine salts, dimethylaminoazobenzene sulfonic acid, black hole quenchers, Iowa black FQ, Iowa black RQ, Qxl quenchers, IRDye QC-1, or a combination thereof. In one example, the fluorescent quencher can include hexamethyleneimine.

A total amount of the mixture of radiation absorbers in the fusing agent can vary depending on the type of radiation absorber. In some examples, a total amount of the mixture of radiation absorbers in the fusing agent can be from about 2 wt % to about 20 wt %. In yet other examples, the total amount of the mixture of radiation absorbers in the fusing agent can be from about 5 wt % to about 15 wt %, from about 5 wt % to about 12 wt %, from about 10 wt % to about 20 wt %, or from about 3 wt % to about 8 wt %. A weight ratio of the water-soluble organic dyes with respect to one another is not particularly limited. However, in some examples, the charged yellow water-soluble organic dye can be present in an amount equal to or greater than an amount of cyan water-soluble organic dye. In other examples, the charged yellow water-soluble organic dye, and/or the cyan water-soluble organic dye can be present in an amount greater than the charged magenta water-soluble organic dye. In some examples, the fusing agent can exclude pigment, metal oxide nanoparticles, or a combination thereof.

Other Fluid Agents

In some examples, the three-dimensional printing kit, three-dimensional printing system, or method of three-dimensional printing can further include other fluid agents, such as coloring agent(s), detailing agent, or the like. A coloring agent, for example, may include an aqueous liquid vehicle and a colorant, e.g., a dye and/or pigment. A detailing agent, on the other hand, may include a detailing compound capable of cooling the polymeric build material upon application. In some examples, the detailing agent can be printed around the edges of the portion of a polymeric build material that was or can be printed with the fusing agent. The detailing agent can increase selectivity between fused and un-fused portions of the polymeric build material by reducing a temperature of the polymeric build material around an edge of the portion to be fused. In other examples, the detailing agent can be printed in areas where the fusing agent was or can be printed to provide additional cooling when printing a three-dimensional object.

In further detail regarding the detailing agent, the detailing compound can be or can include a solvent that can evaporate at a temperature of the polymeric build material supported on the powder bed or build platform. For example, in some cases, the polymeric build material in the powder bed can be preheated to a preheat temperature within about 10° C. to about 70° C. of the fusing temperature of the polymeric build material. In other examples, the detailing compound can provide cooling as a temperature is brought above the preheat temperature due to application of electromagnetic energy applied to the fusing agent (applied to the polymeric build material). Thus, the detailing agent can be a solvent that can evaporate upon contact with the polymeric build material at the preheat temperature and/or fusing temperature, thereby cooling the printed portion through evaporative cooling. In certain examples, the detailing agent can be or can include water, organic co-solvent(s), or combinations thereof, as the detailing compound. In further examples, the detailing agent can be substantially devoid of radiation absorbers. That is, in some examples, the detailing agent can be substantially devoid of ingredients that absorb enough energy from the ultraviolet energy source to cause the polymeric build material to fuse. In certain examples, the detailing agent can include colorants such as dyes or pigments that do not cause the polymeric build material printed with the detailing agent to fuse when exposed to the ultraviolet or HEV energy sources.

Aqueous Liquid Vehicles

As used herein, the term "aqueous liquid vehicle" may refer to the liquid in the fusing agent and/or other fluid agents that may be present, e.g., detailing agent, coloring agent, etc. The aqueous liquid vehicle may include water alone or in combination with a variety of additional components. The aqueous liquid vehicle may be water, or may include water and organic co-solvent, for example. Examples of components that may be included, in addition to water, may include organic co-solvent, surfactant, buffer, antimicrobial agent, anti-kogation agent, chelating agent, buffer, etc. In an example, the aqueous liquid vehicle can include water and organic co-solvent. In another example, the aqueous liquid vehicle can include water, organic co-solvent, and a surfactant. In yet another example, the aqueous liquid vehicle can include water, organic co-solvent, surfactant, and buffer or buffer and a chelating agent.

The aqueous liquid vehicle can include water that may be deionized, for example. In one example, water can be present in the fusing agent, the detailing agent, or other fluid agent at a weight percentage that can vary from about 25 wt % to about 98 wt %, from about 60 wt % to about 94 wt %, or from about 30 wt % to about 75 wt %.

The aqueous liquid vehicle may include organic co-solvent(s). Some examples of co-solvent(s) that may be added to the aqueous liquid vehicle can include ethanol, methanol, propanol, acetone, tetrahydrofuran, hexane, 1-butanol, 2-butanol, tert-butanol, isopropanol, propylene glycol, methyl ethyl ketone, dimethylformamide, 1,4-dioxane, acetonitrile, 1,2-butanediol, 1-methyl-2,3-propanediol, 2-pyrrolidone, glycerol, 2-phyenoxyethanol, 2-phenylethanol, 3-phenylpropanol, or a combination thereof. In one example, the co-solvent can include 2-pyrrolidonone. Whether a single co-solvent is included or a combination of co-solvents are included, a total amount of co-solvent(s) in the fusing agent, the detailing agent, or other fluid agent can be from about 5 wt % to about 50 wt %, from about 10 wt % to about 50 wt %, from about 15 wt % to about 45 wt %, from about 30 wt % to about 50 wt %, from about 5 wt % to about 35 wt %, or from about 5 wt % to about 40 wt %, based on a total weight percentage of the fluid agent.

The aqueous liquid vehicle may also include surfactant. The surfactant can include a non-ionic surfactant, a cationic surfactant, and/or an anionic surfactant. In one example, the fluid agent can include an anionic surfactant. In another example, the fluid agent can include a non-ionic surfactant. In still another example, the fluid agent can include a blend of both anionic and non-ionic surfactant. Example non-ionic surfactant that can be used include self-emulsifiable, non-ionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and molecular defoamer (e.g., SURFYNOL® 420 from Air Products and Chemical Inc., USA). Still other surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 15S9 from The Dow Chemical Company, USA), or a combination thereof. In other examples, the surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), and oleth-3 phosphate surfactant (e.g., CRODAFOS™ N3 Acid from Croda, UK). Example cationic surfactant that can be used can include dodecyltrimethylammonium chloride, hexadecyldimethylammonium chloride, or a combination thereof. In some examples, the surfactant (which may be a blend of multiple surfactants) may be present in the fusing agent, the detailing agent, or other fluid agent at an amount ranging from about 0.01 wt % to about 2 wt %, from about 0.05 wt % to about 1.5 wt %, or from about 0.01 wt % to about 1 wt %.

In some examples, the aqueous liquid vehicle may further include a chelating agent, an antimicrobial agent, a buffer, or a combination thereof. While the amount of these may vary, if present, these can be present in the fusing agent, the detailing agent, or other fluid agent at a total amount ranging from about 0.001 wt % to about 20 wt %, from about 0.05 wt % to about 10 wt %, or from about 0.1 wt % to about 5 wt %.

The aqueous liquid vehicle may include a chelating agent. Chelating agent(s) can be used to minimize or to eliminate the deleterious effects of heavy metal impurities. Examples of suitable chelating agents can include disodium ethylene-diaminetetraacetic acid (EDTA-Na), ethylene diamine tetra acetic acid (EDTA), and methyl-glycinediacetic acid (e.g., TRILON® M from BASF Corp., Germany). If included, whether a single chelating agent is used or a combination of chelating agents is used, the total amount of chelating agent(s) in the fusing agent, the detailing agent, or other fluid agent may range from 0.01 wt % to about 2 wt % or from about 0.01 wt % to about 0.5 wt %.

The aqueous liquid vehicle may also include antimicrobial agents. Antimicrobial agents can include biocides and fungicides. Example antimicrobial agents can include the NUOSEPT® (Ashland Inc., USA), VANCIDE® (R.T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT® 250-T, (Lonza Ltd. Corp., Switzerland), KORDEK® MLX (The Dow Chemical Co., USA), and combinations thereof. In an example, if included, a total amount of antimicrobial agents in the fusing agent, the detailing agent, or other fluid agent can range from about 0.01 wt % to about 1 wt %.

In some examples, an aqueous liquid vehicle may further include buffer solution(s). The buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, from about 7 to about 9, or from about 7.5 to about 8.5. In some examples, the buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added to the fusing agent, the detailing agent, or other fluid agent at an amount ranging from about 0.01 wt % to about 10 wt %, from about 0.1 wt % to about 7.5 wt %, or from about 0.05 wt % to about 5 wt %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "applying" when referring to fusing agent that may be used, for example, refers to any technology that can be used to put or place the fluid, e.g., fusing agent, on the polymeric build material or into a layer of polymeric build material for forming a three-dimensional object. For example, "applying" may refer to a variety of dispensing technologies, including "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though an individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Preparation of Fusing Agents

Multiple ultraviolet fusing agent formulations were prepared by admixing the respective components as shown in Table 1 below.

TABLE 1

Fusing Agent Formulations

| Component Type | Formulation ID | | | |
|---|---|---|---|---|
| | 1 | 2 | 3 | 4 |
| Organic Co-solvent | 30 | 30 | 30 | 30 |
| Surfactant | 0.5 | 0.5 | 0.5 | 0.5 |
| Cyan water soluble organic dye (Cyan 854) | 1.9 | 1.9 | 0.85 | — |
| Charged yellow water-soluble organic dye (AY-23) | 1.9 | 1.9 | 1.9 | 1.9 |
| Charged magenta water-soluble organic dye (AR-52) | 0.95 | 1.9 | 0.35 | 0.35 |
| Fluorescent quencher (Hexamethyeneimine) | 0.95 | — | 0.35 | 0.45 |
| Deionized Water | Balance | Balance | Balance | Balance |

The above formulations were initially tested for jettability by individually dispensing the formulations as bars printed onto a paper medium using an HP® ink jet printer. The fusing agent formulations did not exhibit any negative effects on decap or nozzle health of the print head.

Example 2—Preparation of Three-Dimensional Objects

In order to test the fusing capability of the fusing agent formulations from Table 1 above, rectangular three-dimensional objects (15×40 mm in size) were printed on a single 300 μm thick layer of a polyamide 12 powder spread on a glass substrate. The polyamide 12 powder was held at an elevated temperature of about 30° C. The fusing agents were independently printed at an ink density of 18 picoliters per 600th of an inch (per single pass), which corresponds to a fusing agent to polymeric build material weight ratio of about 1:300. The substrate with polyamide 12 powder and the fusing agent printed thereon was placed under a 395 nm UV-LED light array capable of emitting UV radiation at maximum intensity (100% intensity) of 12 W/cm$^2$ for up to a few seconds.

All of the three-dimensional printed objects fully fused following exposure to the UV-LED light array and were capable of being moved. The incorporation of a mixture of organic dyes did not negatively affect the fusing capability of the charged yellow water-soluble organic dye. High selectivity was observed. Areas of the polyamide 12 powder which were not printed with the fusing agent did not sinter or fuse. A color of the three-dimensional printed objects varied. The three-dimensional object fused with Formulation 1 was black, with Formulation 2 was a dark gray, with Formulation 3 was green, and with Formulation 4 was orange. Mixing organic dyes can permit a wide variety of color options for the three-dimensional printed object.

Example 3—Preparation of Three-Dimensional Objects

In order to test the fusing capability of the fusing agents further, a series of fusing experiments were performed. The various fusing agent formulations from Table 1 were printed five times per formation as described in Example 2, except the substrate with polyamide 12 powder and the fusing agent printed thereon was placed under an UV-LED light array at varying intensities and times. The intensities and times were 12 W/cm$^2$ for 2 seconds, 12 W/cm$^2$ for 1 second, 9.6 W/cm$^2$ for 1 second, 7.2 W/cm$^2$ for 1 second, and 6 W/cm$^2$ for 1 second. All of the three-dimensional printed objects fused following exposure to the UV-LED light array. However, the degree of fusing was less prominent when the substrate with polyamide 12 powder and the fusing agent printed thereon was exposed to an UV-LED array of 7.2 W/cm$^2$ for 1 second and of 6 W/cm$^2$ for 1 second. In addition, an overall hue of the printed objects lightened with decreased UV-LED intensity and fusing time.

Example 4—Fusing Spectra

Figure 4:
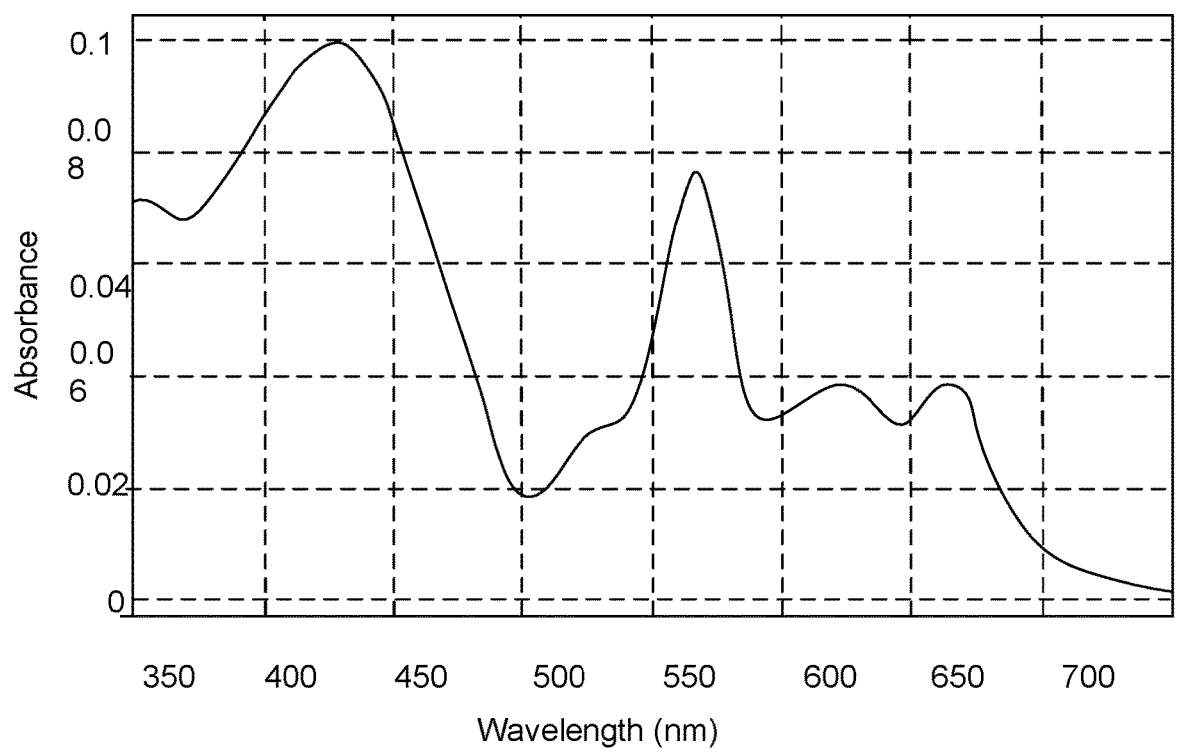
FIG. 4 is a graphic illustration of UV-VIS absorbance spectrum of an example fusing agent formulation in accordance with the present disclosure.
Figure 5:
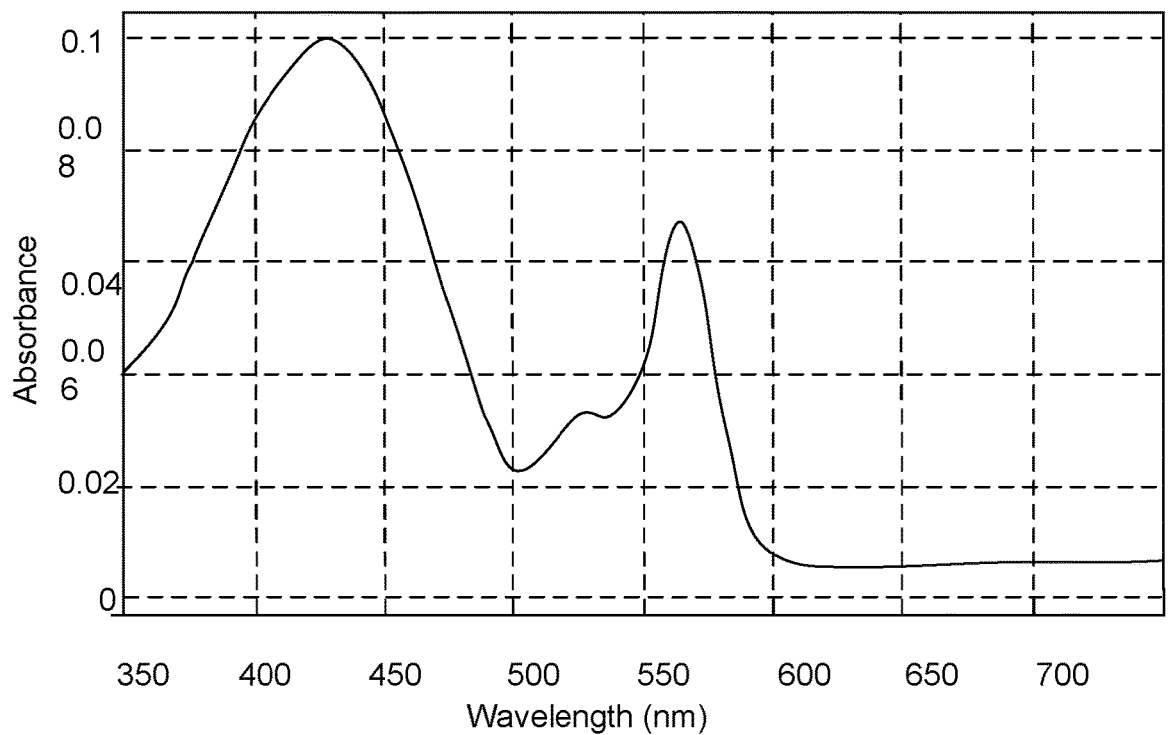
FIG. 5 is a graphic illustration of UV-VIS absorbance spectrum of an example fusing agent formulation in accordance with the present disclosure.

Absorption spectra for Formulations 2 and 4 of Table 1 above were analyzed using UV-Visible spectroscopy. These spectra are illustrated in FIGS. 4 and 5. FIG. 4 illustrates two absorption peaks for fusing agent Formulation 2. One of the absorption peaks was between 400 nm and 450 nm. The other absorption peak appeared between 550 nm and 600 nm. The incorporation of the charged yellow water-soluble organic dye permitted absorption within the UV range between 350 nm to 450 nm, whereas, the incorporation of the cyan water-soluble organic dye rendered the three-dimensional printed part gray in color. The fusing profile for fusing agent Formulation 4 is shown in FIG. 5. This figure illustrates two fusing peaks, one between 400 nm and 450 nm and a second between 550 nm to 600 nm. The fusing profile did not indicate any absorption past 600 nm, whereas the fusing profile for Formulation 2 indicated continued absorption up to around 700 nm. These fusing profiles in combination with the appearance of the printed objects from Example 2, indicate that excluding an organic dye which absorbs wavelengths greater than 600 nm does not result in a three-dimensional printed part having a gray appearance.

The examples above indicate that water-soluble organic dyes can be used as fusing agents for ultraviolet radiation, without being limited to printing yellow objects. The ability to use a mixture of organic dye radiation absorbers in a fusing agent suggests minimal negative impacts and interference with mechanical properties. The examples further demonstrate reliable printability of fusing agents with a mixture of organic dye radiation absorbers with respect to both decap and nozzle health. The ability to print with a mixture of organic dye radiation absorbers without inorganic pigments can enable access to wide-ranging color spaces.

What is claimed is:

1. A three-dimensional printing kit, comprising:
    a polymeric build material including from about 80 wt % to 100 wt % of polymer particles having an average particle size ranging from about 10 µm to about 150 µm; and
    a fusing agent including an aqueous liquid vehicle and from about 2 wt % to about 20 wt % of a mixture of organic dye radiation absorbers, the mixture of organic dye radiation absorbers including a charged yellow water-soluble organic dye and a cyan water-soluble organic dye, wherein the mixture of the organic dye radiation absorbers is from about 1 wt % to about 40 wt % soluble in water, and wherein the charged yellow water-soluble organic dye exhibits a peak absorption of from about 380 nm to about 490 nm, the cyan water-soluble organic dye exhibits a peak absorption of from about 580 nm to about 720 nm, and the charged yellow water-soluble organic dye absorbs electromagnetic energy within a range of from about 350 nm to about 460 nm.

2. The three-dimensional printing kit of claim 1, wherein the polymeric build material is selected from the group consisting of polyamide, polyethylene, polyethylene terephthalate (PET), polyolefin, polystyrene, polyacrylate, polyacetal, polypropylene, polycarbonate, polyester, acrylonitrile butadiene styrene, thermoplastic polyamide, thermoplastic polyurethane, engineering plastic, polyether ketone, polyetheretherketone (PEEK), polyethylene terephthalate, polybutylene terephthalate, polymer blends thereof, amorphous polymers thereof, core-shell polymers thereof, and a copolymer thereof.

3. The three-dimensional printing kit of claim 1, wherein the aqueous liquid vehicle includes from about 5 wt % to about 50 wt % of the organic co-solvent, wherein the organic co-solvent includes ethanol, methanol, propanol, acetone, tetrahydrofuran, hexane, 1-butanol, 2-butanol, tert-butanol, isopropanol, propylene glycol, methyl ethyl ketone, dimethylformamide, 1,4-dioxone, acetonitrile, 1,2-butanediol, 1-methyl-2,3-propanediol, 2-pyrrolidone, glycerol, 2-phyenoxyethanol, 2-phenylethanol, 3-phenylpropanol, or a combination thereof.

4. The three-dimensional printing kit of claim 1, wherein the aqueous liquid vehicle further includes from about 0.01 wt % to about 2 wt % of a surfactant.

5. The three-dimensional printing kit of claim 1, wherein the mixture of the organic dye radiation absorbers further includes a charged magenta water-soluble organic dye.

6. The three-dimensional printing kit of claim 5, wherein the aqueous liquid vehicle further includes a fluorescent quencher.

7. The three-dimensional printing kit of claim 1, wherein the fusing agent includes the mixture of the organic dye radiation absorbers at a weight ratio of from about 3 wt % to about 8 wt %.

8. The three-dimensional printing kit of claim 1, further comprising a detailing agent, wherein the detailing agent includes a detailing compound to reduce a temperature of the polymeric build material onto which the detailing agent is applied.

9. A method for three-dimensional printing utilizing the three-dimensional printing kit of claim 1, the method comprising:
    iteratively applying the polymeric build material as individual layers;
    based on a three-dimensional object model, selectively applying the fusing agent; and
    exposing the powder bed to ultraviolet energy or high-energy visible light having a wavelength in a range from about 350 nm to about 460 nm to selectively fuse portions of the individual layers of the polymeric build material together and form a three-dimensional object.

10. The method of claim 9, wherein a weight ratio of the polymeric build material to the mixture of the radiation absorbers following selectively applying the fusing agent onto the polymeric build material ranges from about 10:1 to about 350:1.

11. The method of claim 9, wherein based on the three-dimensional object model, the method further comprising applying a detailing agent onto individual layers of the polymer build material to selectively cool the polymeric build material.

12. The three-dimensional printing kit of claim 1, wherein the aqueous liquid vehicle includes an organic co-solvent selected from the group consisting of propanol, tetrahydrofuran, hexane, 1-butanol, 2-butanol, tert-butanol, propylene glycol, methyl ethyl ketone, 1,4-dioxone, acetonitrile, 1,2-butanediol, 1-methyl-2,3-propanediol, glycerol, 2-phyenoxyethanol, 2-phenylethanol, 3-phenylpropanol, and a combination thereof.

13. The three-dimensional printing kit of claim 1, wherein the charged yellow water-soluble organic dye absorbs electromagnetic energy within a range of about 350 nm to about 390 nm.

14. A method for three-dimensional printing, the method comprising:
- iteratively applying a polymeric build material as individual layers, the polymeric build material including from about 80 wt % to 100 wt % of polymeric particles having an average particle size ranging from about 10 µm to about 150 µm;
- based on a three-dimensional object model, selectively applying a fusing agent including an aqueous liquid vehicle and from about 2 wt % to about 20 wt % of a mixture of organic dye radiation absorbers, the mixture of organic dye radiation absorbers including a charged yellow water-soluble organic dye and a cyan water-soluble organic dye and wherein the mixture of organic dye radiation absorbers is from about 1 wt % to about 40 wt % soluble in water, wherein the fusing agent includes the charged yellow water-soluble organic dye in an amount equal to or greater than an amount of the cyan water-soluble organic dye in the fusing agent; and
- exposing the powder bed to ultraviolet energy or high-energy visible light having a wavelength in a range from about 350 nm to about 460 nm to selectively fuse portions of the individual layers of the polymeric build material together and form a three-dimensional object.

15. A three-dimensional printing system, comprising:
- a polymeric build material including from about 80 wt % to 100 wt % of polymer particles having an average particle size ranging from about 10 µm to about 150 µm;
- a fusing agent including an aqueous liquid vehicle and from about 2 wt % to about 20 wt % of a mixture of organic dye radiation absorbers, the mixture of organic dye radiation absorbers including a charged yellow water-soluble organic dye and a cyan water-soluble organic dye and wherein the mixture of organic dye radiation absorbers is from about 1 wt % to about 40 wt % soluble in water, and wherein the charged yellow water-soluble organic dye exhibits a peak absorption of from about 380 nm to about 490 nm, the cyan water-soluble organic dye exhibits a peak absorption of from about 580 nm to about 720 nm, and the charged yellow water-soluble organic dye absorbs electromagnetic energy within a range of from about 350 nm to about 460 nm; and
- an ultraviolet energy source that emits ultraviolet energy having a peak wavelength in a range from about 350 nm to about 405 nm, or a high-energy visible light source that emits high-energy visible light having a peak wavelength in a range from about 400 nm to about 460 nm.

16. The system of claim 15, wherein the system includes the ultraviolet energy source and the ultraviolet energy source is a UV-LED array having a peak emission of ultraviolet energy with a narrow band wavelength of less than about 30 nm, wherein the narrow band wavelength corresponds with a peak absorption of at least one of the radiation absorbers in the mixture of the radiation absorbers.

\* \* \* \* \*